United States Patent [19]

Bone, Jr.

[11] Patent Number: 4,538,150

[45] Date of Patent: Aug. 27, 1985

[54] SELF-CALIBRATION OF STACKED BEAM RADAR

[75] Inventor: George D. Bone, Jr., Severna Park, Md.

[73] Assignee: Westinghouse Electric Corp., Pittsburgh, Pa.

[21] Appl. No.: 456,676

[22] Filed: Jan. 10, 1983

[51] Int. Cl.$^3$ .......................... G01S 7/40; G01S 7/18
[52] U.S. Cl. .............................. 343/17.7; 343/12 SB; 343/16 R
[58] Field of Search ................ 343/12 R, 12 SB, 17.7, 343/16 R, 12

[56] References Cited

U.S. PATENT DOCUMENTS

| | | | |
|---|---|---|---|
| 3,064,252 | 11/1962 | Varela | 343/12 SB |
| 3,170,156 | 2/1965 | Downs | 343/17.7 |
| 3,170,157 | 2/1965 | Schreitmueller | 343/12 SB |
| 3,471,855 | 10/1969 | Thompson | 343/17.7 |

Primary Examiner—T. H. Tubbesing
Assistant Examiner—Brian Scott Steinberger
Attorney, Agent, or Firm—Walter G. Sutcliff

[57] ABSTRACT

An apparatus and method for calibrating the output signal of a receiver having amplification over a predetermined input signal amplitude range has been described incorporating means for generating a sequence of reference signals each having a predetermined amplitude, means for coupling the sequence of reference signals to the input of the receiver, means for sensing the output reference signals of the receiver, means for storing output reference signals indicative of the amplitude along with corresponding input reference signals to provide a table of receiver input and output signals over the dynamic range such as 70 dB of the receiver. Unknown input signals are calibrated by looking up and comparing the amplitude of the output received signals of the receiver with stored output reference signals in the table and selecting the corresponding known input signals previously provided by the calibration signals. The invention overcomes the problem of accuracy and stability in the gain of the receiver over a wide dynamic range, such as 70 dB, and for non-uniform amplitude gain between a plurality of receiver channels.

2 Claims, 9 Drawing Figures

SELF-CALIBRATION OF STACKED BEAM RADAR

BACKGROUND OF THE INVENTION

1. Field of the Invention

This invention relates to stacked beam radars, particularly to calibration of a plurality of receiver channels in the radar.

2. Description of the Prior Art

Detection of objects in the vicinity of an observer may normally be accomplished by employing a pulse-echo system, i.e. radar, electro-optical, sonar, etc. which emits pulses. The outgoing pulses are reflected by an object back to the system, the received echoes or signals, and are processed by the system to provide certain data regarding the relative position of the object, such as its range, azimuth, and elevation, with respect to the observer's system. An example of such a system is a stacked beam radar employed as a three dimensional (3D) air surveillance radar, to determine simultaneously the range, azimuth, and elevation of each object, i.e., target, detected. The "stacked beam" refers to the use by this radar of several overlapping receiving antenna beams which are displaced vertically. A description of the stacked beam radar is found in the book entitled "Radar Handbook", by Merrill I. Skolnick, Editor-in-Chief, McGraw-Hill Book Company, 1970, pages 22-4 and 22-5.

In a stacked beam radar, the reflected target signal is received simultaneously by one or more of the beams of the antenna response pattern and is processed by each of the receiving channels associated with its respective antenna beam. One of the principal elements of the computation of the height of a target is the accurate determination of the elevation angle to the target with respect to the antenna system reference axis. An amplitude monopulse measurement is used to compare the relative target signal amplitude in each of the several beams. Relating these measured relative amplitudes to the previously measured antenna beam patterns allows calculation of the elevation angle of the received target signal. The accuracy of the elevation angle is dependent on each channel producing a signal which accurately represents the target signal amplitude received in adjacent overlapping beams of the stacked beam antenna pattern.

For example, in one stacked beam radar system, the center line between two adjacent overlapping beams is considered the base angle, $\theta_b$. From the target returns, the two adjacent overlapping beams indicating the largest target amplitude are selected as being closest to the target direction. The target is then considered to be along the base angle $\theta_b$, or the center line between the two selected beams, plus or minus an interpolation angle, $\theta_i$. The interpolation angle is determined by subtracting the amplitudes of the target signal in one beam from the other beam of the selected beam pair. Variations in the amplitude difference of the target signal of the selected beam pair will result in corresponding variations in the interpolation angle, $\theta_i$. The target may very well be at a position indicated by the interpolation angle plus the base angle with respect to the antenna, or the target may be at a different angle than the interpolation angle due to differences in the gain of the receiving channels of the radar.

During operation of the stacked beam radar, it is assumed that each receiving channel has identical amplitude characteristics. However, this assumption is not usually true since it is difficult to design and build identical receiving channels which operate over wide dynamic range, 70 dB, incorporating logarithmic amplifiers which are difficult to maintain during field operations where temperature changes normally cause differential gain changes between receiving channels.

Built-in monitoring and alignment subsystems have been used to facilitate manual adjustment of amplifiers in the receiving channel. Skilled technicians have been required to make precise adjustments in one or more receiving channels to achieve alignment between channels. However, realignment is required to maintain acceptable accuracy, such as several times a day or more frequently depending upon the changes in ambient temperature. For example, current height receiving channels in a stacked beam radar are intended to attain a ±0.25 dB accuracy over a 70 dB dynamic range of target signals. Experience has shown, however, that ±0.25 dB accuracy is difficult to achieve and maintain over a wide dynamic range which would result in approximately ±600 feet height error at 150 nautical miles range.

In U.S. Pat. No. 3,471,855, issuing on Oct. 7, 1969 to R. T. Thompson, a system is described for generating coherent calibration test signals for an array of receiver channels to measure the gain and phase stability of each of the channels over their operating frequency range. In U.S. Pat. No. 3,471,855 each receiver operates at a different frequency. Calibration signals are derived from a common reference source in a plurality of phase locked synthesizers to provide a plurality of coherent signals. The calibration signals are coupled to the inputs of the receivers with their respective outputs coupled to phase and amplitude comparators which compares the outputs to the initial calibrating waveform. The magnitude of the amplitude and phase error was measured by using a phase shifter and a variable precision digital attenuator to modify the reference calibration signal to the comparator until the amplitudes and phase matched with the signal from the receiver system. The adjustment setting on the phase detector and the digital attenuator provided a measure of the phase and amplitude error.

In U.S. Pat. No. 3,361,972, which issued on Jan. 2, 1968, to J. L. Eaves, a system for automatically adjusting the log slope of the input versus output curve of log receivers in a multiple channel search type radar is described. Automatic slope adjustment in each channel is achieved by injecting two test pulses into the log receiver of each channel every 3,000 microseconds. The log slope of the log receiver initially is set to a preselected value and if for some reason the slope of the log receiver deviates from its preselected value, an error signal will be generated to increase or decrease the log slope of the log receiver to return it to the preselected value. By using test pulses, each receiving channel is adjusted to a preselected value in an attempt to attain absolute matching of the characteristics of two or more receivers. A motor control circuit is used to adjust an attenuator to bring each receiver log slope into alignment with the next.

A self-calibration system utilizing a memory is described in U.S. Pat. No. 4,017,856 which issued on Apr. 12, 1977 to R. J. Wiegand and is assigned to the assignee herein. In the patent to Wiegand a microwave transponder receives RF signals which are converted into a voltage which drives a voltage controlled oscillator to generate an output RF signal of the same frequency as received. The microwave transponder is calibrated to compensate for temperature, oscillator drift and component variations by utilizing an instantaneous frequency discriminator which generates two video signals used for generating a memory address signal which is used to address a memory. The memory output voltage tunes a microwave voltage controlled oscillator to provide an RF output signal. A counter and a digital to analog converter provides voltages to the voltage controlled oscillator which tunes the voltage controlled oscillator to a corresponding microwave output signal. The output signal is coupled to the instantaneous frequency discriminator which generates a memory adjust signal whereupon the digital value from the counter is stored in a location corresponding to the address derived from the instantaneous frequency discriminator. The counter provides a sequence of increasing or decreasing test pulses for generating a wide range of voltages which in turn are stored in the memory at the memory address derived from the instantaneous frequency discriminator.

It is therefore desirable to provide a method of self-calibration for electronic systems which have inherent difficulty in obtaining the required degree of accuracy through design of their performance characteristics, such as the amplitude response of a plurality of receiving channels operating over a wide dynamic range of received target signals.

Furthermore, it is desirable to provide self-calibration of a plurality of receivers which have differences in gain over the desired dynamic range of target signals by utilizing a look-up table.

Furthermore, it is desirable to provide self-calibration by generating test pulses of predetermined amplitude which may be injected into each receiver channel.

Furthermore, it is desirable to make accurate relative amplitude measurements utilizing a common test pulse injected into a plurality of receivers with the amplitude of the output signals stored in a table along with the amplitude of the test pulse.

SUMMARY OF THE INVENTION

In accordance with the present invention, an apparatus and method is provided for calibrating the amplitude of the output signal of a receiver having amplification over a predetermined input signal amplitude range comprising the steps of generating a sequence of signals each having a predetermined amplitude and spaced apart from one another by amplitude increments, said predetermined amplitude extending over said predetermined input signal amplitude range, coupling said sequence of signals to the input of said receiver, sensing the output signals of said receiver as a function of said sequence of input signals, storing signals indicative of the amplitude of the sensed output signals of said receiver and of its input signals to provide the amplitude response of the receiver over said predetermined input signal amplitude range, coupling a signal of unknown amplitude to the input of said receiver, comparing the amplitude of the receiver output signal with said stored signals indicative of the amplitude of the sensed output signal to select one of said stored signals, and coupling the input signal associated with the selected stored output signal to an output terminal to provide a calibrated output signal.

The method and apparatus is applicable to calibrating a plurality of receivers such as found in a stacked beam three-dimensional radar. The calibrated output signals of a three-dimensional stacked beam radar provide more accurate height information of targets.

DESCRIPTION OF THE PREFERRED EMBODIMENT

Figure 1:
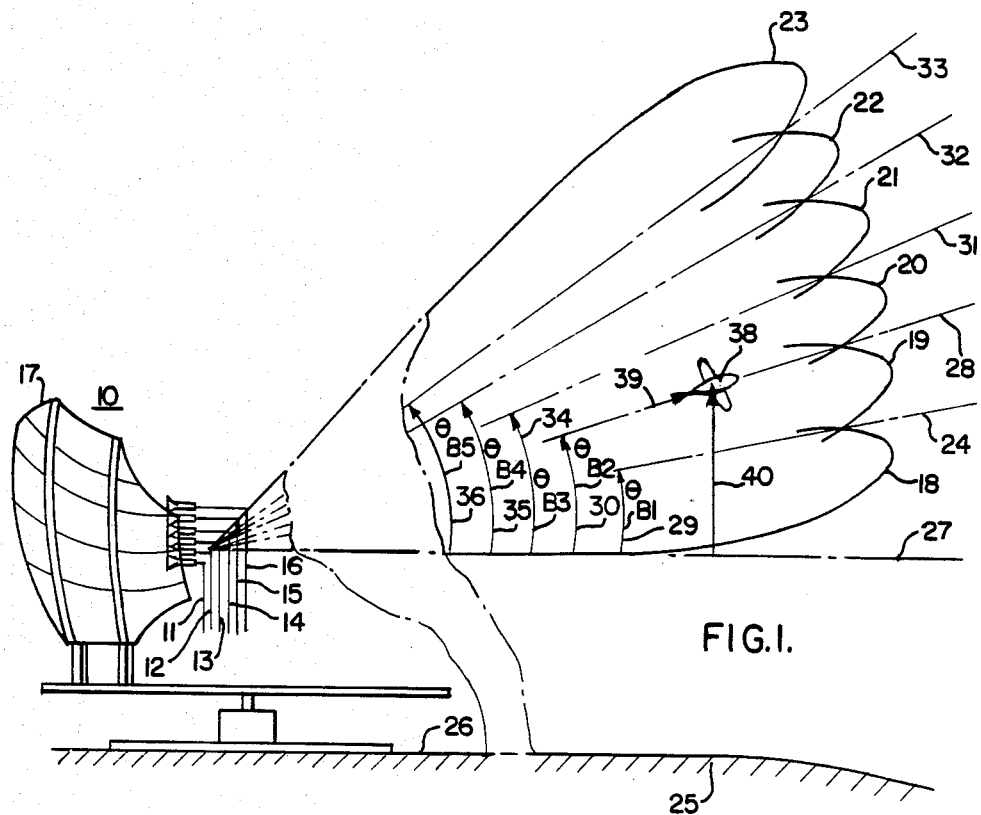
FIG. 1 is a diagram of a stacked beam antenna.

Referring now to the drawings and in particular to FIG. 1 antenna 10 has a plurality of antenna feeds 11 through 16 and an antenna reflector 17 which are arranged physically which is well-known in the art to provide six patterns or beams for transmitting radio frequency and/or microwave energy into space and for reception of radio frequency or microwave energy from space. Curves 18 through 23 in FIG. 1 are representative of patterns for transmitting and receiving RF and/or microwave energy. Each pattern or curve 18 through 23 overlaps the pattern or beam adjacent to it. The midpoint between overlapping beams 18 and 19 where equal energy from a target is received in both beams 18 and 19 is represented by reference line 24. In FIG. 1 earth 25 is shown having a surface 26 which has a certain amount of curvature. Antenna 10 may be positioned on the earth surface 26 or positioned at an elevation above the earth's surface 26. Directly beneath antenna 10, however, originating at the earth surface is a horizon line which originates tangent to the earth surface and extends outward shown by reference line 27. The angle between the horizon reference line 27 and reference line 24, the midpoint between beams 18 and 19, is called the base angle, $\theta_{B1}$ as shown by arrow 29. Similarly, beam 19 overlaps with beam 20 and has a midpoint where the reception of target reflected signals are equal in each beam indicated by reference line 28. Reference line 28 forms an angle of $\theta_{B2}$ with horizon reference line 27 as shown by arrow 30. In a like manner beams 20 and 21 overlap, 21 and 22 overlap and 22 and 23 overlap having midpoints therebetween indicated by reference lines 31 through 33 respectively. Reference lines 31 through 33 form an angle with horizon line 27 indicated by arrows 34 through 36 respectively representing angles $\theta_{B3}$, $\theta_{B4}$ and $\theta_{B5}$ respectively.

In FIG. 1 a target 38 which may be, for example, an airplane, is shown positioned on reference line 28 having a line of sight range shown by arrow 39 with respect to the antenna 10 and having an elevation with respect to the horizon line 27 shown by arrow 40.

In FIG. 1 the curves or patterns 18 through 23 may each have a horizontal beam width of 1.1°, for example, and a vertical beam width of 1.5° to 8.1°, for example. Antenna 10 may be mounted on a bearing to permit rotation of the antenna in azimuth about an axis transverse to the earth surface.

Figure 2A:
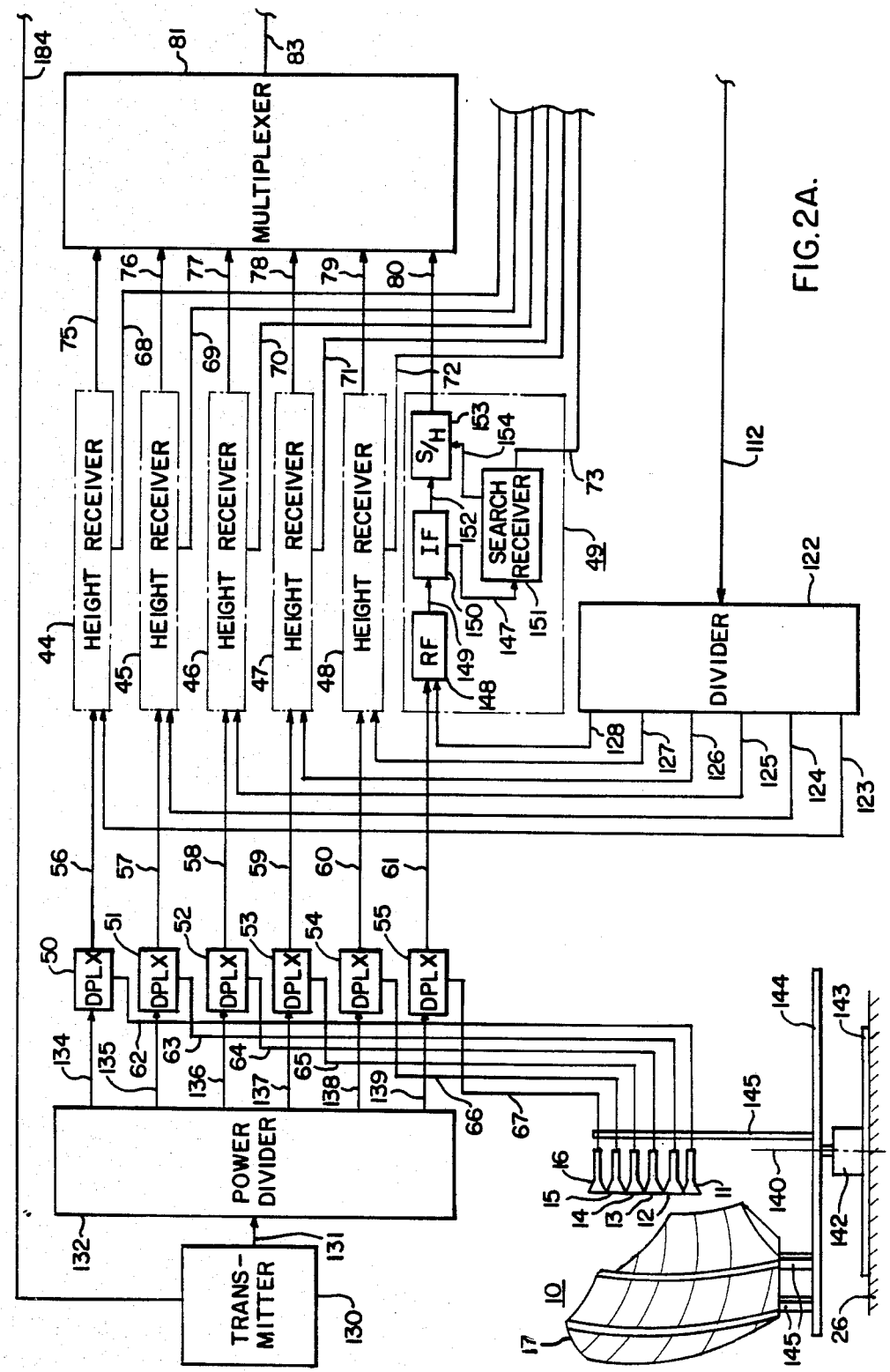
FIGS. 2A and 2B together is one embodiment of the invention.
Figure 2B:
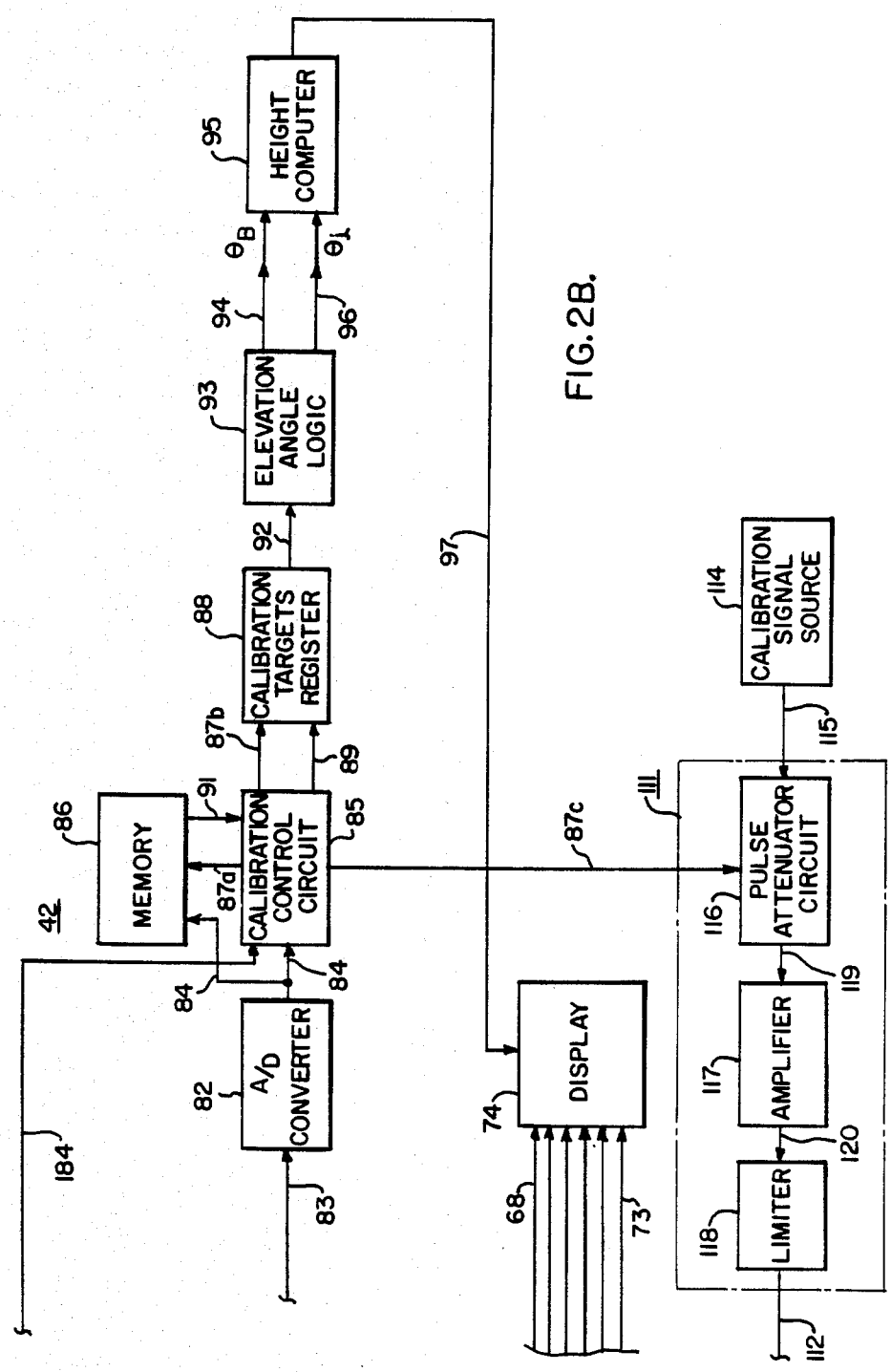

In FIGS. 2A and 2B a three-dimensional stacked beam radar 42 is shown. Height receivers 44 through 49 have a signal input coupled from duplexers 50 through 55 over lines 56 through 61, respectively. Duplexers 50 through 55 are coupled to antenna feeds 16 through 11 of antenna 10 over lines 62 through 67 respectively. Duplexers 50 through 55 function to couple target reflected signals received by antenna 10 to height receivers 44 through 49. A first output of height receivers 44 through 49 are coupled over lines 68 through 73 respectively to display 74. A second output of height receivers 44 through 49 are coupled over lines 75 through 80 to an input of multiplexer 81 which functions to couple one of the input lines to analog to digital converter 82 over line 83. The output of analog to digital converter 82 is coupled over line 84 to an input of calibration control circuit 85.

Calibration control circuit 85 functions to generate control signals for calibrating each height receiver, 44 through 49, by establishing a table in memory 86 which is used to calibrate the target reflected signals on line 84. The target reflected signals after calibration are coupled over line 87c to be stored in calibrated targets register 88. A control signal is coupled over line 89 to calibrate a target register 88. Calibration control circuit 85 couples a control signal such as an address signal over line 87a to memory 86. The signal on line 84 is also coupled to an input of memory 86. An output signal from memory 86 is coupled over line 91 to calibration control circuit 85. The signal on line 91 may, for example, be a signal stored for data in memory 86.

The output of calibrated targets register 88 is coupled over line 92 to an input of elevation angle logic 93. Elevation angle logic 93 functions to select the target reflected signals on two adjacent beams from radiation pattern beams 18 through 23. The base angle associated with the midpoint reference line, for example, one of lines 24, 28 through 33, is coupled over line 94 to height computer 95. A second signal indicative of the interpolation angle $\theta_i$ is coupled over line 96 to an input of height computer 95. The output of height computer 95 is coupled over line 97 to an input of display 74. Height computer 95 functions to provide elevation information with respect to the earth surface 26 at the range or location of the target.

A control signal from calibration control circuit 85 is coupled over line 87c to step attenuator 111. The control signal on line 87c functions to cause a calibration signal to be generated at appropriate times and having an appropriate amplitude on line 112. A calibration signal source 114 is coupled over line 115 to an input of step attenuator 111. Calibration signal source 114 functions to provide a signal such as a pulse of RF or microwave energy having a predetermined amplitude and pulse duration. Step attenuator 111 is comprised of a pulse attenuator circuit 116, an amplifier 117 and a limiter 118. Lines 87c and 115 are coupled to respective inputs of pulse attenuator circuit 116 which has an output coupled over line 119 to an input of amplifier 117. The output of amplifier 117 is coupled over line 120 to an input of limiter 118. The output of limiter 118, which provides a sequence of signals each having a predetermined amplitude and spaced apart from one another, is coupled over line 112 to divider 122. Divider 122 may function to divide the signal on line 112 in equal portions having equal amplitudes on lines 123 through 128 which are each coupled to a respective input of height receivers 44 through 49. The signals on lines 123 through 128 are each fed into a respective height receiver at times when the receiver is not used to receive target reflected signals over lines 56 through 61 and provide outputs on lines 75 through 80 in response to the input signal which may be stored in memory 86. When the height receivers 44 through 49 receive target reflected signals by means of antenna 10 over lines 56 through 61, the unknown amplitude of the input signals are amplified by height receivers 44 through 49. The outputs on lines 75 through 80 are compared with prior outputs stored in memory 86. The input signal associated with the stored output signal in memory 86 is used as an indication of the amplitude of the received input signal which is then stored in calibrated targets register 88.

Transmitter 130 functions to generate a series of signals or pulses of radio frequency or microwave energy which is coupled over line 131 to an input of power divider 132 which functions to divide the signal on line 131 to a plurality of outputs. The outputs of power divider 132 are coupled to duplexers 50 through 55 over lines 134 through 139 respectively. The signals are fed through duplexers 50 through 55 over lines 62 through 67 to antenna 10 whereupon the radio frequency or microwave signals are directed into space according to the pattern shown in FIG. 1 along patterns 18 through 23. The antenna may be rotated about a reference axis 140 and driven by a motor 142 positioned on platform 143. Reflector 17 and antenna feeds 11 through 16 are supported by platform 144 and support means 145.

Figure 3:
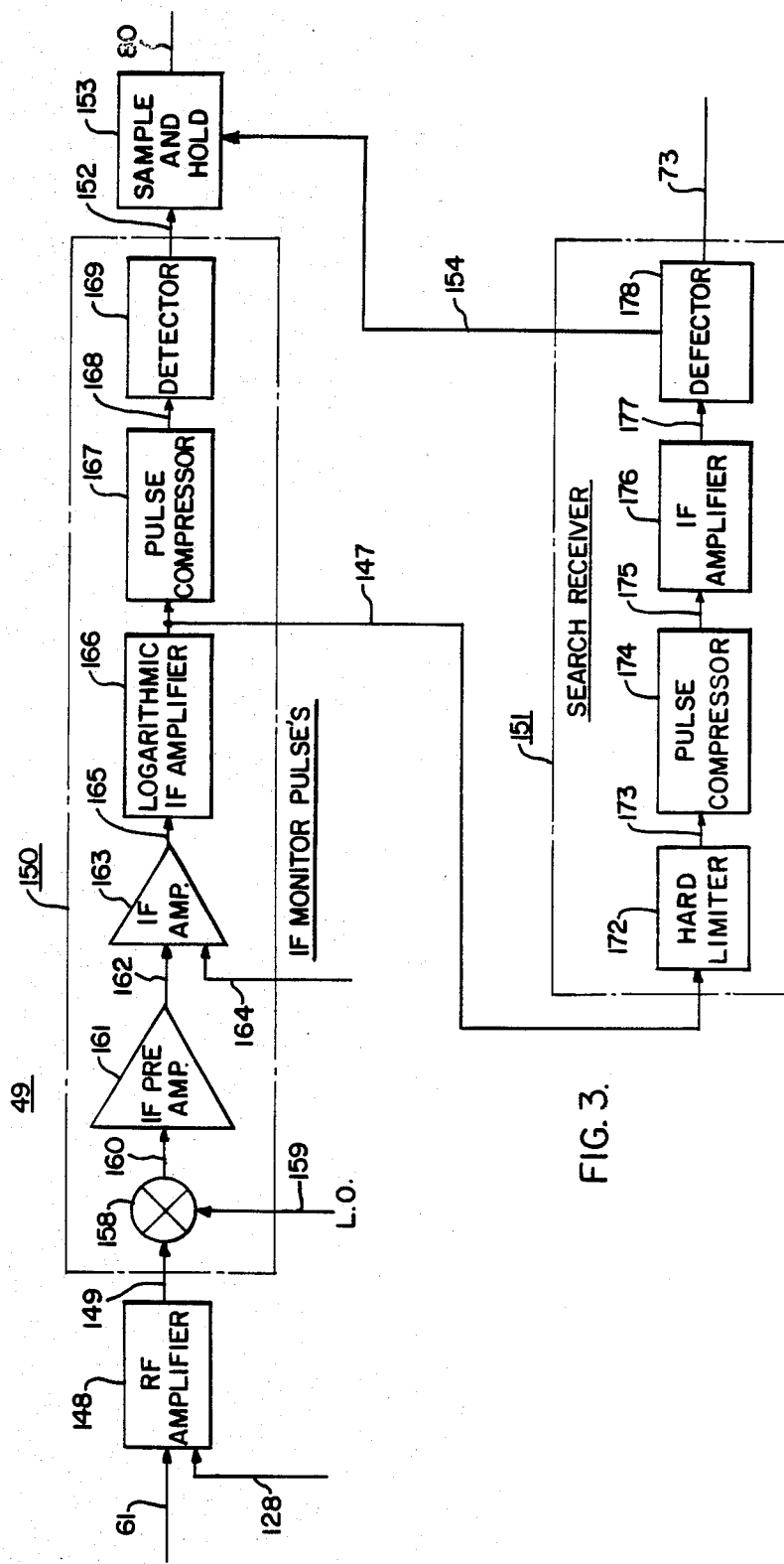
FIG. 3 is a detailed embodiment of a height receiver for use in FIG. 2A.

As shown in FIGS. 2A and 3, height receiver 49 includes a radio frequency amplifier 148 having an input of target reflected signals on line 61 and an input of calibration signals on line 128. The output of radio frequency amplifier 148 is coupled over line 149 to an input of intermediate frequency stage 150. The output of intermediate frequency stage 150 is coupled over line 152 to an input of sample and hold circuit 153 having an output coupled over line 80 to an input of multiplexer 81. A control signal is coupled from search receiver 151 over line 154 to a control input of sample and hold circuit 153 to cause the sample and hold circuit 153 to sample the signal on line 152. An output of search receiver 151 is coupled over line 73 to an input of display 74.

As shown in FIG. 3 intermediate frequency stage 150 further includes a mixer 158 having a first input on line 149 and a second input on line 159 which may be coupled to the local oscillator of transmitter 130, for example. The output of mixer 158 is coupled over line 160 to an input of intermediate frequency preamplifier 161 which functions to amplify the signal on line 160. The output of amplifier 161 is coupled over line 162 to an input of intermediate frequency amplifier 163. A second input to amplifier 163 is coupled over line 164. Line 164 may be coupled to a source of intermediate frequency monitor pulses, for example, for testing or calibrating the electronic circuitry downstream. The output of intermediate frequency amplifier 163 is coupled over line 165 to an input of logarithmic IF amplifier 166. The output of amplifier 166 is coupled over line 147 to an input of search receiver 151 and to an input of pulse compressor 167 which functions to compress the target reflected signal for the case where the target reflected signal is phase coded, for example. The output of pulse compressor 167 is coupled over line 168 to an input of detector 169. The output of detector 169 is coupled over line 152 to an input of sample and hold circuit 153.

As shown in FIG. 3 search receiver 151 further includes a hard limiter 172 having an input coupled to line 147 and an output coupled over line 173 to an input of pulse compressor 174 which may be constructed in the same manner as pulse compressor 167. The output of pulse compressor 174 is coupled over line 175 to an input of intermediate frequency amplifier 176. The ouput of amplifier 176 is coupled over line 177 to an input of detector 178. The output of detector 178 is coupled over line 73 to provide detected target signals to display 74.

A second output of detector 178 is coupled over line 154 to sample and hold circuit 153. The signal on line 154 functions to cause the sample and hold circuit 153 to sample the signal on line 152 at times when a target reflected signal is detected exceeding a predetermined threshold in detector 178. The output of sample and hold circuit 153 is coupled over line 80 through multiplexer 81 and analog to digital converter 82 to an input of calibration control circuit 85.

Figure 4:
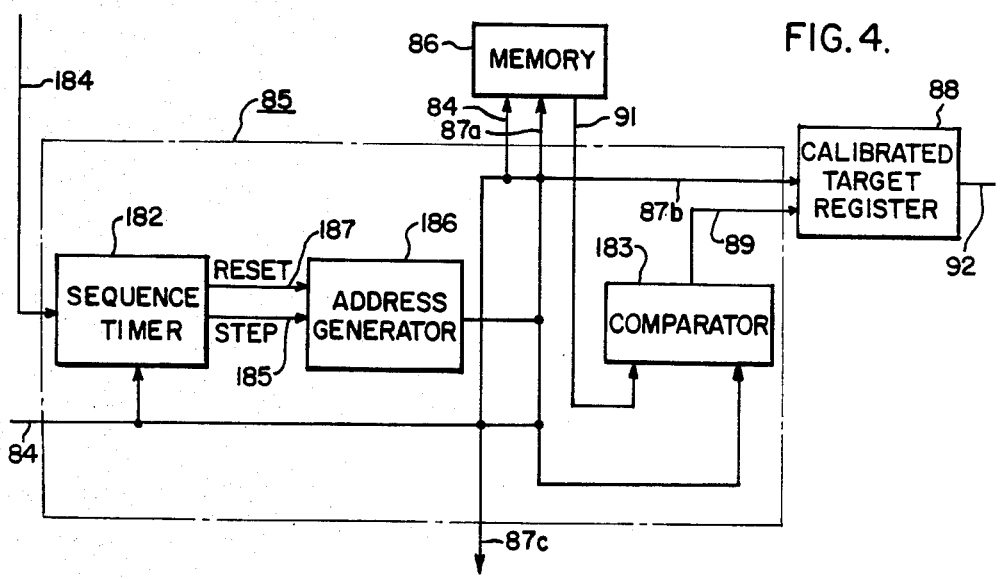
FIG. 4 is a detailed embodiment of a calibration control circuit for use in FIG. 2B.

FIG. 4 shows a detail embodiment of calibration control circuit 85 shown in FIG. 2B. Signal line 84, which carries signals representative of target reflected signals received by each beam of antenna 10, is coupled to sequence timer 182, comparator 183 and memory 86. The presence of data on line 84 causes sequence timer 182 to function to calibrate the data on line 84 by initiating signal "reset" on line 187 and signal "step" on line 185 which are both coupled to address generator 186. The output of address generator 186 is coupled over line 87a to an input of memory 86, 87b to an input of calibrated targets register 88 over 87c and to an input of pulse attenuator circuit 116 as shown in FIG. 2B. The sequence timer is also initiated during non-transmitting periods for calibrating the height receivers by a signal on line 184. The data output of memory 86 is coupled over line 91 to an input of comparator 183. The output of comparator 183 is coupled over line 89 to an input of calibrated targets register 88.

In operation, memory 86 stores calibration data during times when the transmitter 130 is not transmitting and height receivers 44 through 49 are not receiving target reflected signals. Sequence timer 182 causes address generator 186 to be reset and causes signal "step" on line 185 to increment the address in address generator 186 which provides a signal to pulse attenuator circuit 116 shown in FIG. 2B and activates step attenuator 111 to provide a signal of predetermined amplitude on line 112 which is divided by divider 122 and fed through each input of height receivers 44 through 49. The outputs of the height receivers 44 through 49 are multiplexed and converted to a digital signal indicative of its amplitude by A/D converter 82. The output of A/D converter 82 is coupled over line 84 and stored in memory 86 at the address on line 87a. The outputs of all six channels or height receivers 44 through 49 are stored in memory 86 as a function of the address on line 87a. After memory 86 stores the amplitudes of height receiver channels 44 through 49, sequence timer 182 generates another signal "step" on line 185 to address generator 186 causing the address to change by an increment of 1, for example, which in turn causes step attenuator 111 to generator another calibration pulse having its amplitude incremented from the last amplitude on line 112. The resulting output signals on line 84 for each channel 44 through 49 are stored in memory 86 as a function of the address on line 87a. By sequencing through a predetermined number of addresses from address generator 186, data in the form of a table is stored in memory 86 indicative of the output amplitudes of height receivers 44 through 49 as a function of the input signals from step attenuator 111 on line 112. The stored information is useful to provide calibration of unknown input signals of height receivers 44 through 49.

One example of a calibration table for the receivers 44 through 49 is shown in Table I, Table I may, for example, be typical of height receivers having logarithmic amplifiers.

TABLE I

| Calibration Input Level Line 112 | Memory Address Line 87 | Receiver | | | | | |
|---|---|---|---|---|---|---|---|
| | | 44 Line 75 | 45 Line 76 | 45 Line 77 | 47 Line 78 | 48 Line 79 | 49 Line 80 |
| N | N | 190 | 230 | 320 | 275 | 300 | 265 |
| N-1 | N-1 | 180 | 220 | 300 | 250 | 180 | 240 |
| N-2 | N-2 | 170 | 210 | 280 | 240 | 260 | 230 |
| N-3 | N-3 | 160 | 200 | 260 | 225 | 240 | 215 |
| N-4 | N-4 | 150 | 190 | 240 | 210 | 220 | 200 |
| N-5 | N-5 | 140 | 180 | 220 | 200 | 200 | 190 |
| N-6 | N-6 | 130 | 170 | 200 | 190 | 180 | 180 |
| N-7 | N-7 | 120 | 160 | 180 | 175 | 160 | 165 |
| N-8 | N-8 | 110 | 150 | 160 | 150 | 140 | 140 |
| N-9 | N-9 | 100 | 140 | 140 | 140 | 120 | 130 |
| . | . | . | . | . | . | . | . |
| . | . | . | . | . | . | . | . |
| . | . | . | . | . | . | . | . |
| N-(N − 1) | N-(N − 1) | . | . | . | . | . | . |

Figure 5:
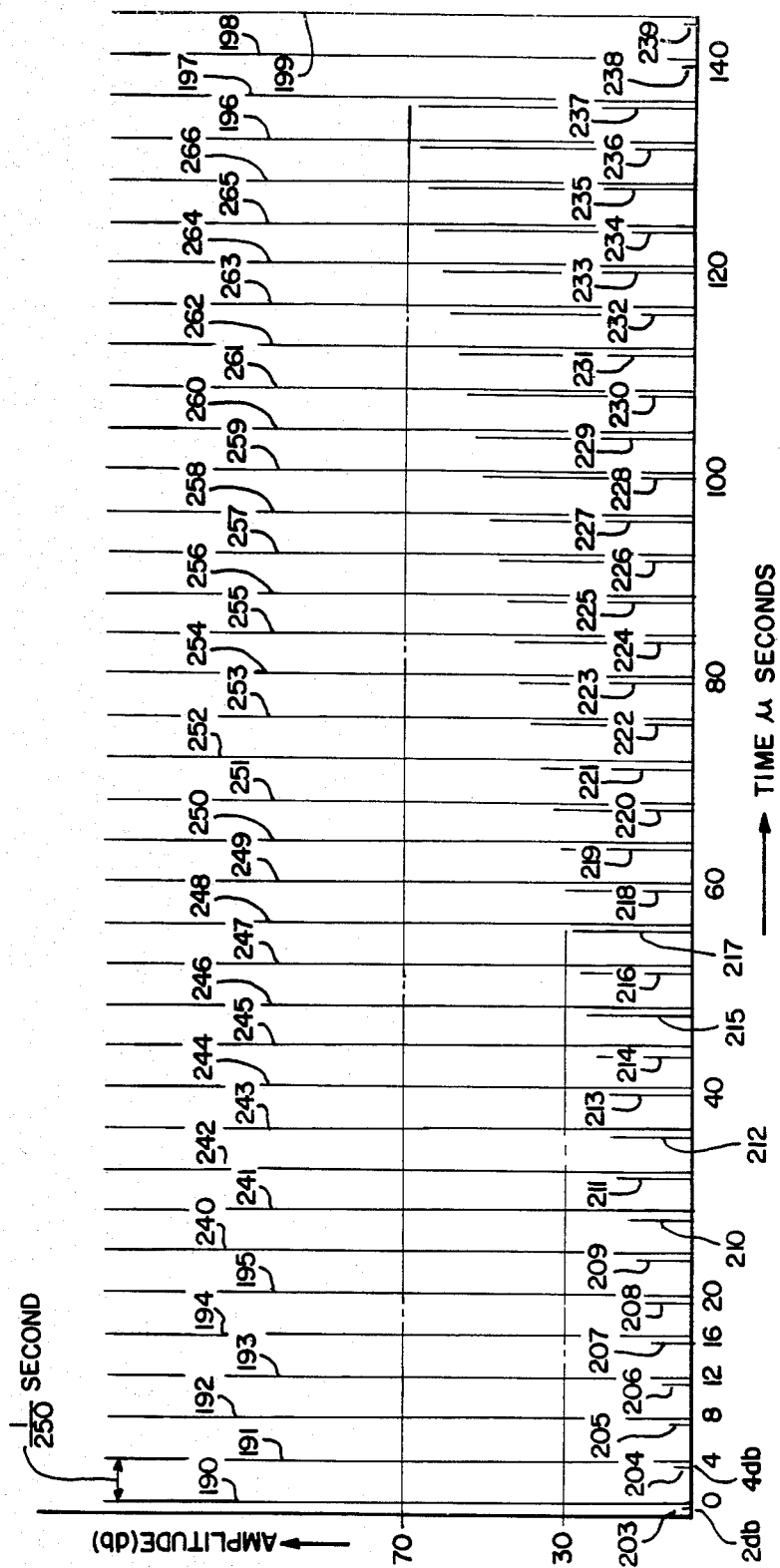
FIG. 5 is a graph showing the relationship of the transmitted pulse and the calibration pulse with respect to amplitude and time.

The calibration input level or the amplitude of the input level is stepped over N increments where each increment may, for example, be two decibels in amplitude. The calibration input level may be a function or the same as the address from address generator 186. As can be seen in Table 1, 2.0 decibel attenuator steps in the calibration input level does not cause equal change in each output of the height receivers 44 through 49 since the gain, bias, and linearity of each height receiver channel is not necessarily equal. If the height receivers are calibrated over 70 decibels dynamic range, then the number N in Table 1 would be 35, N being the number of calibration input levels. If the peak pulse repetition frequency (PRF) of a radar is 250 pulses per second and if one calibration input level is inserted into the height receivers between transmitted pulses as shown in FIG. 5, then the entire calibration table may be generated in 1/7 of a second. The calibration table may be updated each time the calibration amplitude cycles over the dynamic range such as 0 to 70 dB. Other techniques, such as averaging several calibrations at the same amplitude level, might be used.

FIG. 5 is a graph showing the relationship of the transmitted pulse and the calibration pulse with respect to amplitude and time. In FIG. 5, the ordinate represents amplitude in decibels and the abscissa represents time in microseconds. In FIG. 5, the transmitted pulse generated by transmitter 130 and emitted by antenna 10 occurs at every four microseconds such as at 0, 4, 8, 12, etc. microseconds as shown by curves 190 through 195, 240 through 266 and 196 through 199. After transmitting each pulse from the antenna 10, duplexers 50 through 55 disconnect the transmitter 130 from antenna 10 and couple receivers 44 through 49 to antenna 10. Antenna 10 receives any target reflected echoes according to its sensitivity pattern as shown in FIG. 1, for example. Following reception from the longest range cell of interest and before the end of the four microsecond period for transmitting another pulse, calibration control circuit 85 causes a calibration pulse to be injected into height receivers 44 through 49 over lines 123 through 128. Curves 203 through 237 show a sequence of signals each having a predetermined amplitude and spaced apart from one another by amplitude increments of 2 decibels. Thirty-five curves are shown extending over a dynamic range from 2 to 70 decibels. The sequence is repeated as shown by curves 238 and 239 which are similar in amplitude to curves 203 and 204, respectively. Curves 203 through 237 as well as curves 238 and 239 are spaced apart every 4 microseconds and occur prior to the transmission of a transmitter pulse during receiver dead time of the radar when receivers 44 through 49 are not used for receiving target reflected signals.

Figure 6:
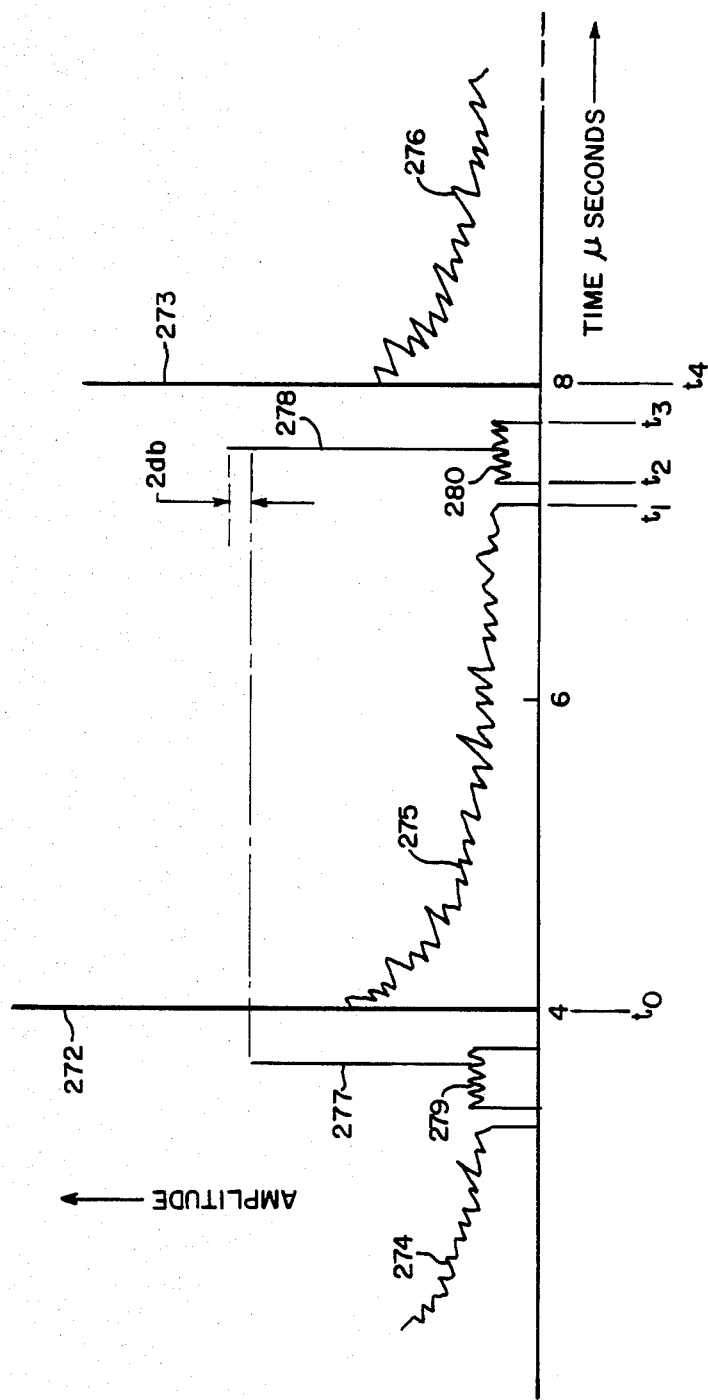
FIG. 6 is a graph showing the typical waveform signals at the input of the height receiver.

FIG. 6 is a graph showing the typical waveform of target reflected signals and noise at the input of one of the height receivers such as height receiver 49. In FIG. 6, the ordinate represents amplitude and the abscissa represents time in microseconds. Curves 272 and 273 represent transmitted radar pulses at times T0 and T4. Curves 274 through 276 represent target reflected signals and noise on line 61 received by antenna 10 after transmitting a radar pulse. Curves 277 and 278 represent calibration pulses. As shown in FIG. 6, curve 278 has an amplitude of 2 decibels more than the amplitude of curve 277. Curves 279 and 280 show low level input noise.

During the interval between T0 and T1, height receivers are receiving radar reflected signals and noise from antenna 10. During the time interval T1 to T2, the receiver is not receiving any signal from antenna 10. During time interval T2 to T3, the receiver is receiving a calibration pulse from step attenuator 111. During time interval T3 to T4, the receiver is not receiving any input signal from step attenuator 111.

Figure 7:
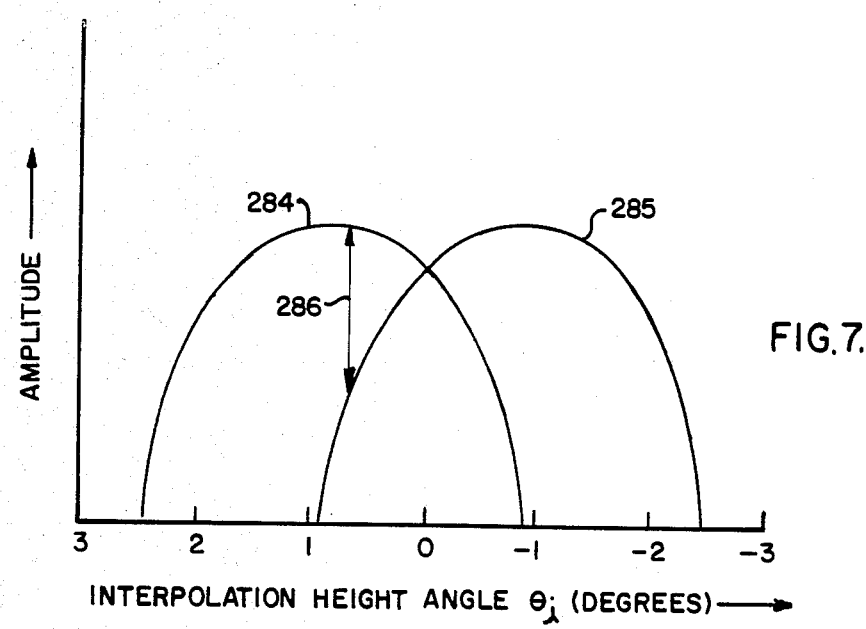
FIG. 7 is a graph showing the amplitude of target reflected signals with respect to two beams of a stacked beam antenna.

FIG. 7 is a graph showing the amplitude of target reflected signals with respect to target position in the two beams of a stacked beam antenna. In FIG. 7, the ordinate represents amplitude and the abscissa represents interpolation height angle $\theta_i$ in degrees. An example of two overlapping antenna beams having patterns as shown in FIG. 7 may, for example, be patterns 21 and 20 in FIG. 1. Curve 284 corresponds to the amplitude pattern 21 in FIG. 1 and curve 285 corresponds to the amplitude pattern 20 in FIG. 1. The angle where the interpolation height angle $\theta_i=0$ in FIG. 7 corresponds to the position of reference line 31 and to the midpoint between patterns 20 and 21 in FIG. 1 having a base angle of $\theta_{B3}$ shown by arrow 34. The interpolation angle in FIG. 7 is therefore added to or subtracted from the base angle $\theta_{B3}$ to provide a more accurate position of the target. If a target reflected signal is located at an elevation angle $\theta_i$ of two-thirds degree as shown in in FIG. 7 along the abscissa, the signal amplitude from each receiver channel of the adjacent beams will correspond to the amplitude on curves 284 and 285 where $\theta_i$ is two-thirds degree, the difference in amplitude is shown by arrow 286. When signals are received of unknown position, the receiver amplitudes in two adjacent beams are subtracted from each other. The difference in amplitude of the received signals corresponds to a position on the abscissa in FIG. 7 providing an interpolation angle $\theta_i$ above or below the base angle $\theta_{B3}$.

Figure 8:
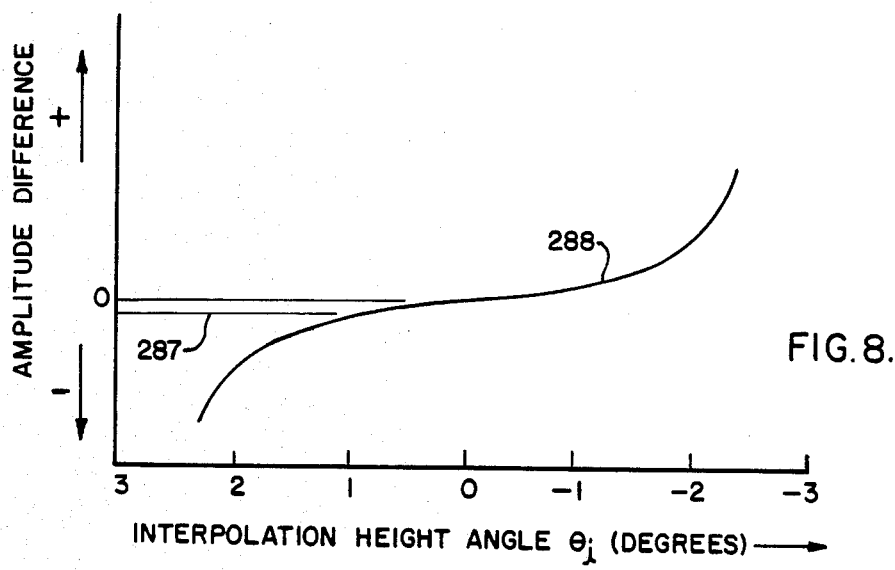
FIG. 8 is a graph showing the amplitude difference of target reflected signals with respect to two beams of a stacked beam antenna as shown in FIG. 7.

FIG. 8 is a graph showing a curve 288 of the amplitude difference as a function of $\theta_i$ when the amplitude of curve 284 is subtracted from curve 285. The amplitude difference represented by arrow 286 in FIG. 7 corresponds to the amplitude difference of curve 288 at reference line 287 in FIG. 8 at the interpolation angle of two-thirds degree. The interpolation angle $\theta_i$ is therefore determined by subtracting the amplitudes of the target reflected signals in two adjacent receiver channels indicating an interpolation angle $\theta_i$ spaced from the midpoint of the two beams depending upon the amplitude magnitude of the difference.

In operation of the embodiment shown in FIGS. 2A and 2B, transmitter 130 generates a pulse which is radiated by antenna 10. Target reflected signals are received by antenna 10 by at least two overlapping beams which are stacked one upon another. Each pattern is fed to a height receiver which generates an amplitude signal in response to the target reflected signal received in each beam. If the amplitude is sufficient in search receiver 151, then the sample and hold circuit in each receiver will sample the amplitude of the height receiver and pass it on through multiplexer 81 to A/D converter 82. Referring to FIG. 4, the amplitude signal on line 84 is passed into calibration control circuit 85 which starts sequence timer 182 and is coupled to one input of comparator 183. Sequence timer 182 causes address generator 186 to step through the memory addresses causing memory 86 to read out the data stored at each address on line 91 which is coupled to a second input of comparator 183. When the amplitudes of the target receive signal on line 84 and the data from memory 91 compare in comparator 183, an output signal on line 89 causes the calibrated targets register 88 to store the value of the address from address generator 186 on line 87b corresponding to the address of the data which compared with the input data on line 84. The address is indicative of the corresponding calibration signal previously described which was fed to the input of the height receiver to generate the initial data stored in memory 86. The output of the calibrated targets register 88 on line 92 provides a signal for each channel indicative of a calibration input signal. The output of each channel is therefore calibrated.

Elevation angle logic 93 functions to select the beam pair out of the six beams shown having the greatest target reflective signal amplitudes. The base angle $\theta_B$ associated with the beam pair as shown in FIG. 1 is coupled over line 94 to height computer 95.

Elevation angle logic 93 also takes the difference of the amplitudes of the selected beam pair to determine the difference amplitude. The difference amplitude is converted to an interpolation angle $\theta_i$ by utilizing, for example, a graph or look-up table such as shown in FIG. 8 to provide an interpolation angle indicative of the amplitude difference. The interpolation angle is coupled over line 96 to an input of height computer 95.

Height computer 95 calculates the height of the target reflected signal utilizing the base angle $\theta_B$, the interpolation angle $\theta_i$, antenna tilt angle, if any, and the elevation of the antenna 10 above the horizon. The elevation of the horizon or earth below antenna 10 is also used to addition to the earth's curvature as a function of range to determine the target height with respect to sea level, for example.

As previously described, during receiver dead time and before the transmitter generates another transmitting pulse, a calibration signal is attenuated and fed to the input of the height receivers to generate data to be stored in memory 86. In this manner, height receivers may be continually calibrated and target reflected signals may be continually corrected to provide output signal amplitudes independent of the non-linearities of the gain and amplification of height receivers 44 through 49. Since the two adjacent beams with the maximum target signal amplitudes are selected, the difference in their dynamic range or amplitude difference is less than the overall dynamic range of the target reflected signals for all beams. The spread or difference in amplitude among all beams may, for example, be 70 decibels. The difference in amplitude of the two channels having the maximum target reflected signal amplitude may be, for example, 14 decibels.

A method and apparatus for calibrating the amplitude of the output signal of a receiver having amplification over a predetermined input signal amplitude range has been described incorporating means for generating a sequence of signals each having a predetermined amplitude and spaced apart from one another by amplitude increments extending over the predetermined input signal amplitude range, means for coupling the sequence of signals to the input of the receiver, means for sensing the output signal of the receiver as a function of the sequence of input signals, means for storing signals indicative of the amplitude of the sensed output signals of the receiver and of its input signals to provide the amplitude response of the receiver over the predetermined input signal amplitude range, means for coupling a signal of unknown amplitude to the input of the receiver, means for comparing the amplitude of the receiver output signal with the stored signals indicative of the amplitude of the sensed output signal to select one of the stored signals, and means for coupling the input signal associated with the selected stored output signal to an output terminal to provide a calibrated output signal.

I claim:

1. A stacked beam radar system including a transmitter and multi-channel receiver having amplification over a predetermined input signal amplitude range, wherein amplified received radar target signals are compared to a stored amplified calibrated value to permit accurate measurement of relative target amplitude in each channel, which system comprises:

stacked beam transmitting means for transmitting a signal towards a target;

multi-channel receiver means for receiving target reflected signals including means for amplifying said target reflected signals;

means for generating a sequence of reference signals each having a predetermined amplitude;

means for coupling the sequence of reference signals to the input of respective channels of the receiver;

means for sensing calibrated output reference signals of the receiver fed from the input reference signals;

means for storing the calibrated output reference signals indicative of amplitude along with corresponding input reference signals to provide a table of receiver reference input signals and calibrated output reference signals over the dynamic range of the receiver;

means for looking up and comparing the amplified output received signals produced by an unknown amplitude target signal input to the receiver with stored calibrated output reference signals, and selecting the corresponding known reference signal which produced the calibrated output reference signal which most closely matches the amplified output received signals, and using said corresponding known reference signal as an indication of the amplitude of the unknown reflected receiver input signal.

2. A method of permitting accurate measurement of relative target amplitude in each receiver channel of a stacked beam radar system including a transmitter and a multi-channel receiver having amplification over a predetermined input signal amplitude range; which method comprises:

transmitting a signal towards a target;

receiving and amplifying the target reflected signals;

generating a sequence of reference signals each having a predetermined amplitude and coupling the sequence of reference signals to the input of respective channels of the receiver;

sensing and storing calibrated output reference signals from the receiver had from the input reference signals to provide a stored table of receiver reference input signals and calibrated output signals over the dynamic range of the receiver;

comparing the received and amplified target reflected signal produced by an unknown amplitude target signal input to the receiver with the stored calibrated output reference signals, and selecting the corresponding predetermined reference signal which produced the calibrated output reference signal which most closely matches the amplified target reflected signal, and using this corresponding predetermined reference signal as a measure of the amplitude of the unknown target reflective receiver input signal.

* * * * *